Jan. 1, 1963  W. LANGKOP  3,070,978
COUPLING JOINT
Filed July 18, 1961  2 Sheets-Sheet 2

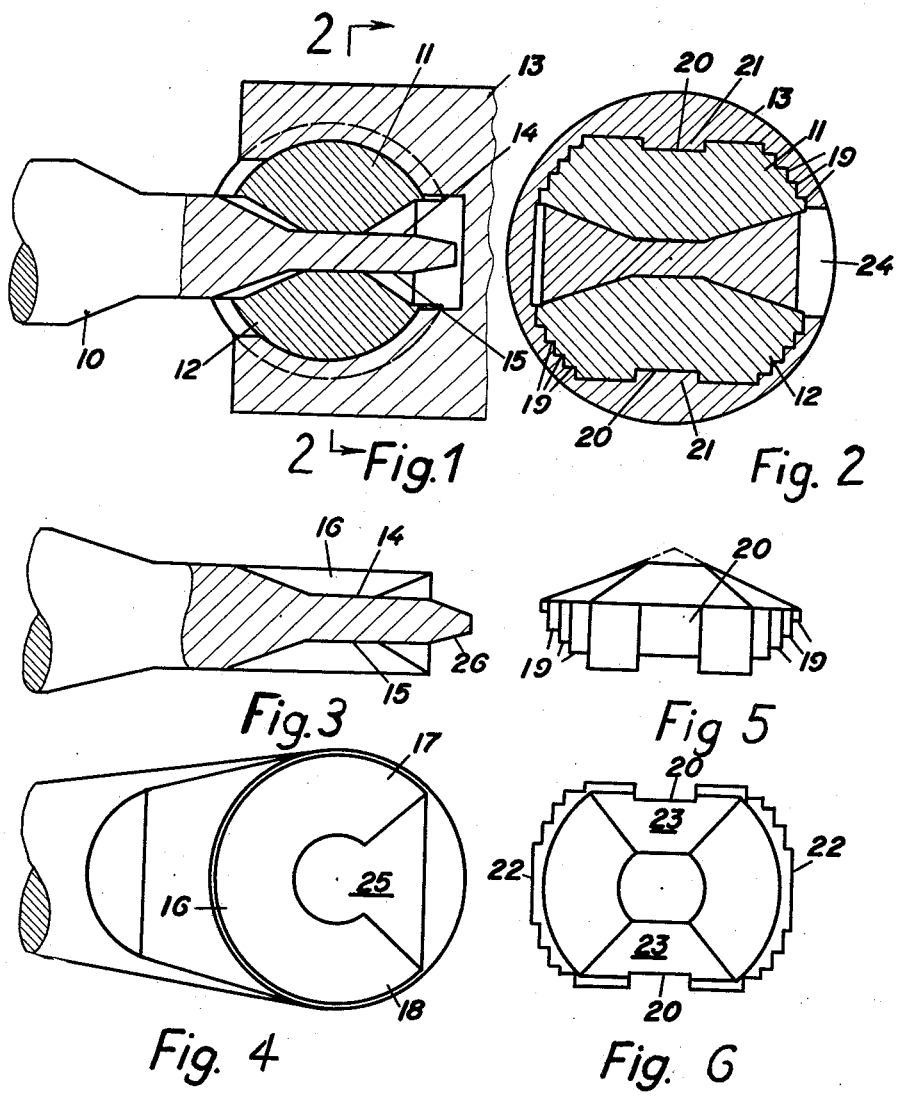

Inventor:

Willi Langkop

United States Patent Office 3,070,978
Patented Jan. 1, 1963

3,070,978
COUPLING JOINT
Willi Langkop, Peine, Germany, assignor to Ilseder Hutte,
Peine, Hannover, Germany
Filed July 18, 1961, Ser. No. 124,987
Claims priority, application Germany July 20, 1960
12 Claims. (Cl. 64—7)

The present invention relates to a coupling joint for transmitting rotary force or torque between two elongated coupling members and more particularly to a coupling joint in which the inner coupling member presents a flattened conically recessed centrally plane end portion adapted to slide between two oppositely disposed substantially frusto-conical power transmitting elements connected to the outer coupling member.

Coupling joints which include coupling or torque transmitting elements between the inner and outer coupling members are employed extensively in foundries and in plants for manufacturing rubber and synthetic products. In these prior art coupling joints the coupling elements consist of cylindrical sections which are set into corresponding recesses of the coupling sleeve or socket and are usually retained therein by means of a dovetail-shaped connection. The coupling elements have confronting flat surfaces for transmitting the torque to or from a flattened end portion of the inner coupling member or shaft having two opposite parallel plane surfaces. The coupling members are usually interlocked by means of screws or bolts.

This prior art type of coupling structure is subject to considerable wear so that there is a constant expense in repairs and replacements as well as the concomitant interruption of the production even under normal loads. Although these disadvantages are quite apparent and very troublesome no satisfactory solution has been found so far to eliminate these drawbacks by means of an improved coupling joint.

It has now been found that the disadvantages inherent in the use of these prior art coupling joints are based on the fact that there is actually only a line contact between the flat or leaf portion of the inner coupling member and the coupling elements. Such a reduced contact area is not adapted to withstand the load transmission stresses which arise during operation. Therefore a more suitable structural form of the individual cooperating coupling joint parts has been designed which provides a substantially increased surface area between the coupling members and the intermediate coupling elements to thereby substantially increase the ability of the coupling joint to transmit the torque stresses without the adverse effects of prior art constructions.

According to the invention this difficult problem has been solved in an extremely satisfactory and complete manner by providing a coupling joint in which the coupling elements have an inwardly directed conical surface configuration which engages complementary concave recesses in the end portion of the inner coupling member and the outer surface of the coupling elements is formed like a partial cylinder whose surface is designed to make a secure connection during operation with the coupling sleeve or socket of the outer coupling member. A coupling joint according to the invention may suitably comprise two oppositely disposed coupling elements having frusto-conical inwardly directed confronting surfaces and the complementary conical contact surfaces of the inner coupling member each having a recessed portion for inserting and removing the corresponding conical section surface of the associated transmission or coupling elements, the outer coupling member having at least one axially directed insertion slot for the end of the inner coupling member placed perpendicularly to the coupling axis. By providing the cylindrical surface of the coupling elements in a stepped and notched arrangement engaging correspondingly stepped and protruding portions in the outer coupling sleeve a simple and strong structure is obtained, the stepped surface of the coupling elements determining in combination a spherical configuration.

It is therefore an object of this invention to provide a novel coupling joint comprising frusto-conical coupling elements which engage complementary concave conical portions in the inner coupling member over a substantial surface area.

It is another object of the invention to provide a coupling joint comprising frusto-conical elements whose outer surface consists of a partial cylinder having a notched or stepped engagement with the coupling sleeve thereby providing a larger effective contact surface improving the strength of the coupling sleeve.

It is a further object of the invention to provide a coupling joint comprising an inner coupling member having flattened end portions consisting of two opposite plane parallel surfaces bordered laterally and rearwardly by a frusto-conical or dished surface.

It is still another object of the invention to provide a coupling joint comprising frusto-conical elements having flat opposite side surfaces and an inner coupling member whose end portion consists of a flat central end portion surrounded laterally and rearwardly by a frusto-conical surface wherein the inner coupling member is introduced through an axial aperture in the coupling sleeve of the outer coupling member at a 90° angle to the common operating axis of the two coupling members and is subsequently pivoted into axial alignment with the outer coupling member whereby the inner coupling member is locked in position in the coupling sleeve.

These and other objects and features of the invention will become apparent hereinafter from the specification and the accompanying drawings in which:

FIG. 1 is a side view, partly in section, of an embodiment of the coupling joint according to the invention.

FIG. 2 is a cross-section along line 2—2 of FIG. 1.

FIG. 3 is a side view partly in section of the end portion of the inner coupling member.

FIG. 4 is a plan view of the end portion of the inner coupling member.

FIG. 5 is a side view of a frusto-conical coupling element according to the invention as incorporated in the coupling joint assembly of FIG. 1.

FIG. 6 is a plan view of the frusto-conical coupling member according to the invention as incorporated in the coupling joint assembly of FIG. 1.

Figure 7:
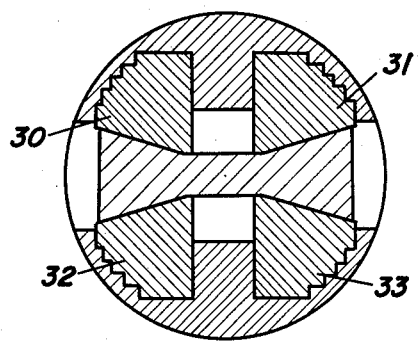
FIG. 7 is a modification of the coupling joint of FIG. 1 showing four coupling elements constituting a coupling assembly of substantially similar effect as the coupling elements according to FIG. 1.

Referring now more particularly to FIG. 1 of the drawing reference numeral 10 designates a shaft or coupling member hereinafter called the inner coupling member which is connected through intermediate coupling or torque transmitting elements 11 and 12 to an outer coupling member 13. The outer coupling member 13 is preferably a coupling sleeve or socket connected to another shaft, the torque being transmitted between the two shafts through the coupling sleeve 13. The end portion of the inner coupling member has a central flattened portion forming two oppositely plane parallel surfaces 14 and 15 as best seen in FIG. 3 of the drawing. Each plane central surface 14 or 15 is surrounded laterally and rearwardly by a concave conical or bowl shaped rim portion 16 (FIG. 1) whose lateral portions 17 respectively 18 contitute friction or locking surfaces as will be explained more fully hereafter.

Referring still to FIG. 1 of the drawing the coupling elements 11 and 12 consist of sections of a cylinder the inner portions of which are preferably frusto-conical and adapted to fit properly into the corresponding opposite bowl shaped or conical rim portion at the end of the inner coupling member. The two coupling elements 11 and 12 together with the end portion of the inner coupling member 10 constitute substantially a ball or sphere.

Referring now more particularly to FIG. 2 of the drawing the surface of the coupling element consisting of a partial cylinder is provided with steps 19 which engage opposite grooved portions in the inner surface of the coupling sleeve. The outer cylindrical stepped surface portions of the coupling elements provides a very substantial surface contact between the coupling elements and the coupling sleeve, as does the inner conical surface portion of the coupling elements relative to the conical or bowl shaped end portion of the inner coupling member. A groove 20 is cut into the top of each coupling element and a tongue 21 of the coupling sleeve protrudes into this grooved portion to guide the coupling element relative to the coupling sleeve and to transfer the torque from the inner coupling member to the sleeve. Furthermore the grooved portion in the coupling member provides a strong construction of the coupling sleeve. As mentioned above the coupling elements have a frusto-conical inwardly directed configuration the point of which would lie approximately on the axial central line of the coupling joint. As best seen in FIG. 6 of the drawing the opposite sides 22 of each coupling element which are directed toward the center of the coupling sleeve as shown in FIG. 2, have a true conical or rounded surface. The two opposite sides 23 (FIG. 6) of each coupling member adjacent the sides 22 have a flat or plane surface.

According to the invention this particular arrangement and surface variation of the coupling elements makes possible the novel connection of the inner coupling member to the coupling sleeve as will be now described. The coupling sleeve is provided at least on one side (FIG. 2) with an axially extending slot 24 through which the inner coupling member may be introduced. To make this assembly possible the end portion of the inner coupling member is recessed as best shown in FIG. 4 of the drawing, and a central tongue 25 is formed which is bordered on the sides and in the back by the concave conical or bowl shaped wall or rim portions 16. The sides 17 respectively 18 of this bowl shaped rim 16 constitute locking surfaces for the rounded surfaces 22 of the cooperating element in the following manner:

The end of the inner coupling member is introduced into slot 24, the tapered end portion 26 of the central tongue 25 facilitating the insertion of the inner coupling member between the oppositely disposed coupling elements. The introduction of the coupling member is made possible by the fact that the side portions 23 of the coupling elements are flat or plane. This inserting operation is best understood by reference to FIGS. 2 and 6 and by imagining the end of the inner coupling member being inserted into sleeve 13 through slot 24 at the right side of the sleeve member as shown in FIG. 2, thus perpendicularly to the common operating axis of the torque transmitting shafts. After the inner coupling member has been inserted in this manner into the coupling sleeve the inner coupling member is pivoted by 90° into its proper operating position in co-axial alignment with the outer coupling member and its torque transmitting shaft. In this position the lateral friction or locking surface 17 of the bowl shaped rim 16 are engaged by the rounded side portions 22 of the associated coupling member in a cupped relationship which prevents their relative movement in an axial direction. Of course this engagement may be again released by pivoting the inner coupling member by 90° to its position perpendicular to the longitudinal axis of the sleeve member so as to bring the locking surfaces into a position opposite the flat sides of the coupling elements which makes it possible to slide the inner member from the coupling sleeve.

Referring now particularly to FIG. 7 of the drawing there is shown a modifiction of the coupling joint of FIG. 2 in which four coupling elements 30, 31, 32 and 33 are employed instead of the two opposite coupling members 11 and 12 as in the embodiment of FIG. 1. Coupling elements 30 and 31 are mounted opposite coupling elements 32 and 33 respectively. The provision of additional coupling elements often facilitates the assembly or disassembly as well as the repair or replacement of the coupling elements due to wear or damage. In this arrangement the coupling sleeve is provided with an insertion slot 24 for the inner coupling member on two opposite sides so that the connection may be accomplished through either side of the coupling sleeve.

Figure 8:
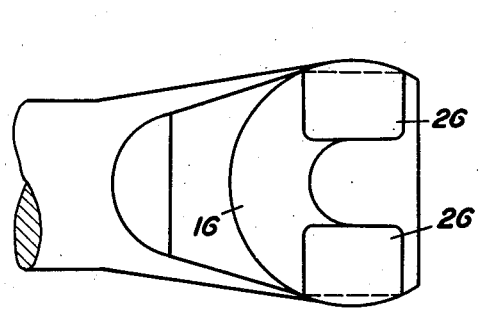
FIG. 8 is a modification of the form of the end portion of the inner coupling member.
Figure 9:
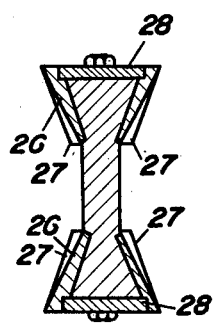
FIG. 9 is an end view of the end portion of the inner coupling member of FIG. 7 showing friction plates detachably and adjustably connected to the conically concave sides of the flattened end of the inner coupling member.

A modification of the end portion of the inner coupling member is shown in FIGS. 8 and 9 particularly in that the lateral friction or locking surfaces of the bowl shaped rim 16 are provided with replaceable and adjustable locking plates 26. These plates 26 have a conical or rounded surface 27 adapted to receive and engage in locking relationship the complementary conical or rounded surfaces 22 of the coupling elements. The locking plates may be retained in place by means of side plates 28 which are secured to the end portion of the coupling member by screws or bolts 19.

Figure 10:
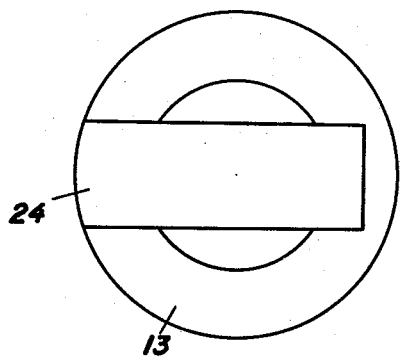
FIG. 10 shows an end view of the coupling sleeve and of the insertion slot for introducing the end of the inner coupling member.
Figure 11:
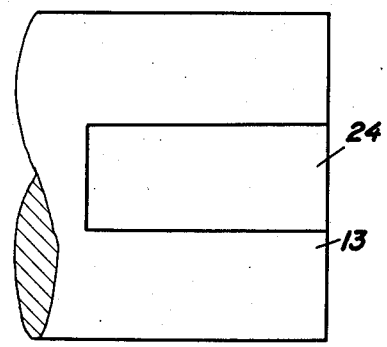
FIG. 11 is a side view showing the axially extending insertion slot in the coupling sleeve according to FIG. 10.

FIGURES 10 and 11 illustrate the insertion slot in the outer coupling member or in the coupling sleeve or socket. FIG. 10 is an end view of a coupling sleeve and shows how the insertion slot extends radially into the coupling sleeve. FIG. 11 is a side view of the coupling sleeve and shows the opening of the axially extending insertion slot 24.

While the invention has been described in connection with several different embodiments thereof, it will be understood that it is capable of further modification; and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

What is claimed is:

1. A coupling joint for transmitting torque between two rotatable members comprising an inner coupling member having a flattened end portion surrounded rearwardly by a conical wall portion, an outer coupling member having a cavity for receiving said inner coupling member, a plurality of coupling elements disposed in said cavity between said inner and said outer coupling members, said coupling elements having an inner conical surface for engaging the conical wall portion of said inner coupling member and an outer partially cylindrical surface engaging said outer coupling member, said outer coupling member having at least one opening for connecting said inner coupling member to said outer coupling member.

2. A coupling joint for transmitting torque between two rotatable members comprising in combination an outer coupling member and an inner coupling member, said outer coupling member having a cavity in its end portion for receiving said inner coupling member, a pair of coupling elements disposed in said cavity for connecting said inner coupling member to said outer coupling member, said inner coupling member having an end portion including two parallel plane surfaces each surrounded rearwardly by a conical rim portion, said coupling elements having an inwardly directed surface for engaging said conical rim portion of said inner coupling member and an outwardly directed partially cylindrical surface connected to said outer coupling member, said outer coupling member having at least one lateral opening for connecting said inner coupling member to said outer coupling member.

3. A coupling joint according to claim 2 wherein said coupling elements have an inwardly directed frusto-conical surface for engaging said conical rim portion and said plane parallel surfaces of the inner coupling member.

4. A coupling joint according to claim 2 wherein the inwardly directed conical surface of said coupling elements is provided with two opposite plane surfaces extending transversely of the longitudinal axis of said coupling joint.

5. A coupling joint according to claim 2 wherein the outwardly directed partially cylindrical surfaces of said coupling elements are provided with stepped peripheral portions engaging complementary notched portions in the inner wall of said outer coupling member.

6. A coupling joint according to claim 2 wherein said inner coupling member and said pair of coupling elements constitute substantially a spherical configuration.

7. A coupling joint according to claim 2 wherein the outwardly directed partially cylindrical surface of said coupling elements has at least one guide groove engaged by a corresponding tongue protruding from the inner wall of said outer coupling member.

8. A coupling joint according to claim 2 wherein the point of the inwardly directed conical surface of said coupling elements is located on the center lines of the longitudinal axis of said coupling joint.

9. A coupling joint according to claim 4 wherein the inner extremity of the inner coupling member terminates in a flat tongue portion surrounded rearwardly by said conical rim portion defining a channel for engaging the plane surfaces of said coupling elements upon inserting the end of said inner coupling member into said coupling member through said lateral opening.

10. A coupling joint according to claim 2 wherein the combined stepped portions in the partially cylindrical surfaces of said coupling elements form substantially a spherical configuration.

11. A coupling joint according to claim 2 wherein curved plate members adapted to the conical portion of said coupling elements are connected detachably and adjustably to the conical rim portions of said inner coupling member.

12. A coupling member according to claim 2 wherein each of said pair of coupling elements is divided into at least two spaced parts engaged between inwardly extending projections of said outer coupling member and the end portion of said inner coupling member.

References Cited in the file of this patent
UNITED STATES PATENTS

| | | |
|---|---|---|
| 1,193,499 | Baker | Aug. 8, 1916 |
| 1,667,455 | Burns | Apr. 24, 1928 |
| 1,836,987 | Peake | Dec. 15, 1931 |
| 2,118,028 | Biggert | May 24, 1938 |